(12) United States Patent
Wyrwas et al.

(10) Patent No.: US 9,921,688 B2
(45) Date of Patent: Mar. 20, 2018

(54) LARGE AREA INTERACTIVE DISPLAY SCREEN

(71) Applicant: QUALCOMM Incorporated, San Diego, CA (US)

(72) Inventors: John Michael Wyrwas, Mountain View, CA (US); Russell Wayne Gruhlke, Milpitas, CA (US); Khurshid Syed Alam, Mountain View, CA (US); Kalin Mitkov Atanassov, San Diego, CA (US); Vikas Ramachandra, San Diego, CA (US); Hasib Ahmed Siddiqui, San Diego, CA (US); James Wilson Nash, San Diego, CA (US); Robert Mitchell Kleiman, San Diego, CA (US); Albrecht Johannes Lindner, La Jolla, CA (US); Evgeni Petrovich Gousev, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 14/626,679

(22) Filed: Feb. 19, 2015

(65) Prior Publication Data

US 2015/0253931 A1 Sep. 10, 2015

Related U.S. Application Data

(60) Provisional application No. 61/947,971, filed on Mar. 4, 2014.

(51) Int. Cl.
*G06F 3/041* (2006.01)
*G06F 3/042* (2006.01)

(52) U.S. Cl.
CPC .......... *G06F 3/0425* (2013.01); *G06F 3/0412* (2013.01); *G06F 3/0416* (2013.01); *G06F 3/0421* (2013.01); *G06F 2203/04104* (2013.01)

(58) Field of Classification Search
CPC .... G06F 3/0425; G06F 3/0421; G06F 3/0416; G06F 2203/04104
See application file for complete search history.

(56) References Cited

U.S. PATENT DOCUMENTS 7,705,835 B2 4/2010 Eikman
2004/0012573 A1* 1/2004 Morrison ............. G06F 3/0428
345/173

(Continued)

FOREIGN PATENT DOCUMENTS

EP 2325735 A2 5/2011
WO WO-0184251 A2 11/2001

(Continued)

OTHER PUBLICATIONS

International Search Report and Written Opinion—PCT/US2015/016800—ISA/EPO—dated May 15, 2015.

(Continued)

*Primary Examiner* — Ariel Balaoing
(74) *Attorney, Agent, or Firm* — Weaver Austin Vileneuve & Sampson LLP—QUAL

(57) ABSTRACT

An interactive display, including a cover glass having a front surface that includes a viewing area provides an input/output (I/O) interface for a user of an electronic device. An arrangement includes a processor, a light source, and a camera disposed outside the periphery of the viewing area coplanar with or behind the cover glass. The camera receives scattered light resulting from interaction, with an object, of light outputted from the interactive display, the outputted light being received by the cover glass from the object and directed toward the camera. The processor determines, from image data output by the camera, an azimuthal angle of the object with respect to an optical axis of the camera and/or a distance of the object from the camera.

26 Claims, 16 Drawing Sheets

(56) References Cited

U.S. PATENT DOCUMENTS

| | | | |
|---|---|---|---|
| 2006/0146560 A1* | 7/2006 | Lewin | G01B 11/25 |
| | | | 362/560 |
| 2009/0189878 A1* | 7/2009 | Goertz | G06F 3/0421 |
| | | | 345/175 |
| 2010/0001962 A1 | 1/2010 | Doray et al. | |
| 2010/0020334 A1 | 1/2010 | Nakanishi | |
| 2010/0315383 A1* | 12/2010 | Chang | G06F 3/0428 |
| | | | 345/175 |
| 2011/0298753 A1* | 12/2011 | Chuang | G06F 3/0428 |
| | | | 345/175 |
| 2012/0188188 A1 | 7/2012 | Smith | |
| 2014/0168487 A1 | 6/2014 | Yamada | |

FOREIGN PATENT DOCUMENTS

| | | |
|---|---|---|
| WO | WO-2005026930 A2 | 3/2005 |
| WO | WO-2014055806 A1 | 4/2014 |

OTHER PUBLICATIONS

Teiche A., et al., "Multi-Touch Technologies", May 31, 2009 (May 31, 2009), pp. 1-89, XP055031240, Retrieved from the Internet: URL:http://www.elvis.ac.nz/twikipub/Main/Multi-touchTable/multi-touch-technologies.pdf.

* cited by examiner

LARGE AREA INTERACTIVE DISPLAY SCREEN

CROSS-REFERENCE TO RELATED APPLICATIONS

This disclosure claims priority to U.S. Provisional Patent Application No. 61/947,971, filed Mar. 4, 2014, entitled "LARGE AREA INTERACTIVE DISPLAY SCREEN," and assigned to the assignee hereof. The disclosure of the prior application is considered part of and is incorporated by reference in its entirety in this patent application.

TECHNICAL FIELD

This disclosure relates to techniques for providing touch responsive capabilities to devices with large display screens, and, more specifically, an interactive display that provides a user input/output interface, controlled responsively to a user's touch and or multiple simultaneous touches.

DESCRIPTION OF THE RELATED TECHNOLOGY

It is difficult to scale traditional multi-touch systems to large size (>24" diagonal) displays. Projected capacitance, used for most smartphones, has been limited in size by high resistivity of indium tin oxide electrodes (which may degrading the RC time constant and signal to noise level), and cost for processing. Optical approaches based on shadow detection or frustrated total internal reflection (FTIR) do not scale well to large size displays due to the large number of components.

Existing camera-based optical touch systems have two primary disadvantages which limit their application in consumer electronics. First, since the camera is typically looking across the surface of the display, the camera adds significant bezel height around the outside of the display. Designs of modern flat screen devices prefer an aesthetically-pleasing, flat bezel. Secondly, these systems are susceptible to occlusions and ghost touches due to the sideways view angle of the cameras, thus limiting the locations where objects may be reliably detected, and the quantity of objects that may be detected.

SUMMARY

The systems, methods and devices of the disclosure each have several innovative aspects, no single one of which is solely responsible for the desirable attributes disclosed herein.

One innovative aspect of the subject matter described in this disclosure can be implemented in an interactive display that includes one or more cameras, each mounted within the plane or behind the plane of a display cover glass. The camera, which may be an IR sensitive, VGA micro camera, may output image data from which the location(s) of a touch or a simultaneous, multiple touches may be determined. The disclosed techniques avoid adding significant bezel height around the outside of the display while enabling location(s) of touch(es) to be accurately determined and minimizing effects of occlusion when two or more touches are occurring simultaneously.

According to some implementations, an apparatus or electronic device may cooperate with the interactive display to provide an input/output (I/O) interface to a user of the apparatus. The interactive display includes a cover glass having a front surface that includes a viewing area. The electronic device may include the interactive display or be electrically or wirelessly coupled to the interactive display. The apparatus may include a processor, a light source, and one or more cameras disposed outside the periphery of the viewing area, coplanar with or behind the cover glass. When an object, such as a user's finger or a hand held object contacts the front surface of the display, at least some of the light scattered from the object may be received by the cover glass and directed toward the camera. The cameras may detect such light and output, to the processor, image data of the detected light. The processor may determine, from the image data, one or both of an azimuthal angle of the object with respect to an optical axis of the camera and a distance of the object from the camera.

According to some implementations, an apparatus includes an interactive display, a processor, a light source at least one camera. The interactive display includes a cover glass having a front surface that includes a viewing area, and provides an input/output (I/O) interface for a user of an electronic device. The light source emits one or both of visible and infrared light. The at least one camera is disposed outside the periphery of the viewing area, coplanar with or behind the cover glass. The camera is configured to receive scattered light resulting from interaction, with an object, of light outputted from the interactive display, at least some of the scattered light being received by the cover glass from the object and directed toward the camera. The processor is configured to determine, from image data output by the camera, one or both of an azimuthal angle of the object with respect to an optical axis of the camera and a distance of the object from the camera.

In some examples, the processor may be configured to determine both of an azimuthal angle of the object with respect to an optical axis of the camera and a distance of the object from the camera.

In some examples, the cover glass may include a first planar light guide, disposed proximate to the front surface, the first planar light guide being configured to receive the scattered light, at least some of the received scattered light undergoing total internal reflection (TIR) within the first planar light guide. The light turning arrangement may include a second planar light guide disposed behind the first planar light guide and the outputted light may result from the second planar light guide reflecting emitted light from the light source in a direction having a substantial component orthogonal to the front surface. The light source may be optically coupled with the second planar light guide. The interactive display may be disposed between the first planar light guide and the second planar light guide. The first planar light guide may be disposed in front of the front surface, the second planar light guide may be disposed behind the first planar light guide, and the outputted light may result from the second planar light guide reflecting emitted light from the light source in a direction having a substantial component orthogonal to the front surface. The second planar light guide may function as a front light of the interactive display.

In some examples, the outputted light may illuminate an area above the interactive display.

In some examples, the processor may be configured to control one or both of the interactive display and the electronic device.

In some examples, the light source may be an infrared light source and the interactive display is a liquid crystal display.

In some examples, the processor may be configured to determine the distance of the touch from the camera by analyzing image data, output by the camera, of a plurality of kaleidoscope reflections received by the camera. The processor may be configured to determine the distance by analyzing a spatial separation between two or more of the plurality of kaleidoscope reflections.

In some examples, the processor may be configured to determine the azimuthal angle of the touch of the touch with respect to an optical axis of the camera by analyzing image data, output by the camera, of at least one kaleidoscope reflection received by the camera.

In some examples, the at least one camera includes two or more cameras, and the processor is configured to determine the azimuthal angle of the touch by triangulation of image data, output by the camera.

In some examples, the viewing area may have a diagonal dimension exceeding 24 inches.

According to some implementations, a method includes determining, with a processor, a location of a user touch from an output of at least one camera, and controlling, with the processor, one or both of an electronic device and an interactive display that provides an input/output (I/O) interface for the electronic device, responsive to the determine the location of the user touch. The interactive display includes a cover glass having a front surface that includes a viewing area, the camera is disposed outside a periphery of the viewing area, coplanar with or behind the cover glass, the output of the camera results from receiving, with the camera, scattered light, the scattered light resulting from interaction, with an object, of light outputted from the interactive display, at least some of the scattered light being received by the cover glass and directed toward the camera and the location is determined by the processor determining, from image data output by the camera, an azimuthal angle of the object with respect to an optical axis of the camera and a distance of the object from the camera.

In some examples, the determining the location of the user touch may include analyzing image data, output by the camera, of a plurality of kaleidoscope reflections received by the camera. The determining the distance of the object from the camera may include analyzing a spatial separation between two or more of the plurality of kaleidoscope reflections. The determining the azimuth angle may include analyzing image data, output by the camera, of at least one kaleidoscope reflection received by the camera.

According to some implementations, an apparatus includes an interactive display, including a cover glass having a front surface that includes a viewing area, and providing an input/output (I/O) interface for a user of an electronic device, a processor, a light source that emits one or both of visible and infrared light, and at least one means for detecting light disposed outside the periphery of the viewing area coplanar with or behind the cover glass, the light detecting means being configured to receive scattered light resulting from interaction, with an object, of light outputted from the interactive display, at least some of the scattered light being received by cover glass from the object and directed toward the light detecting means, the light detecting means being configured to output image data, corresponding to the received scattered light, to the processor. The processor is configured to determine, from the image data, an azimuthal angle of the object with respect to an optical axis of the light detecting means and a distance of the object from the light detecting means.

In some examples, the cover glass may include a first planar light guide, disposed proximate to the front surface, the first planar light guide being configured to receive the scattered light, at least some of the received scattered light undergoing total internal reflection (TIR) within the first planar light guide. The light turning arrangement may include a second planar light guide disposed behind the first planar light guide, and the outputted light may result from the second planar light guide reflecting emitted light from the light source in a direction having a substantial component orthogonal to the front surface.

In some examples, the processor may be configured to control one or both of the interactive display and the electronic device.

According to some implementations, a non-transitory computer readable medium has software stored thereon, the software including instructions executable by a processor, the instructions causing the processor to determine a location of a user touch from an output of at least one camera, and control one or both of an electronic device and an interactive display that provides an input/output (I/O) interface for the electronic device, responsive to the determined location of the user touch. The interactive display includes a cover glass having a front surface that includes a viewing area. The camera is disposed outside a periphery of the viewing area, coplanar with or behind the cover glass. The output of the camera results from receiving, with the camera, scattered light, the scattered light resulting from interaction, with an object, of light outputted from the interactive display, at least some of the scattered light being received by the cover glass and directed toward the camera. The location is determined by the processor determining, from image data output by the camera, an azimuthal angle of the object with respect to an optical axis of the camera and a distance of the object from the camera.

In some examples, the instructions may cause the processor to determine the location of the user touch by analyzing image data, output by the camera, of a plurality of kaleidoscope reflections received by the camera. The instructions may cause the processor to determine the distance of the object from the camera by analyzing a spatial separation between two or more of the plurality of kaleidoscope reflections.

In some examples, the instructions may cause the processor to determine the azimuth angle by analyzing image data, output by the camera, of at least one kaleidoscope reflection received by the camera.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1:
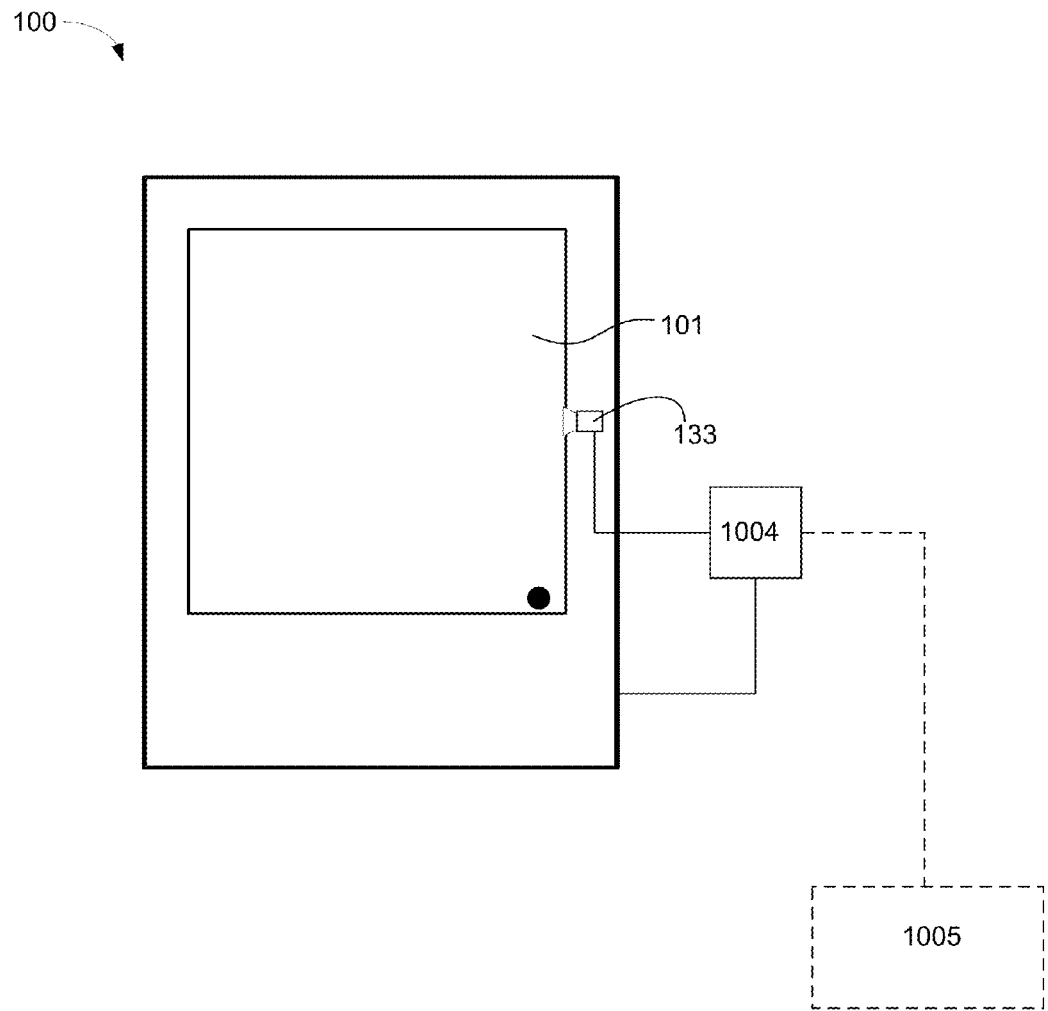
FIG. 1 illustrates a simplified block diagram of an interactive display, according to an implementation.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device or system that can be configured to display an image, whether in motion (e.g., video) or stationary (e.g., still image), and whether textual, graphical or pictorial. More particularly, it is contemplated that the described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (i.e., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS), microelectromechanical systems (MEMS) and non-MEMS applications), aesthetic structures (e.g., display of images on a piece of jewelry) and a variety of EMS devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Described herein below are new techniques for providing an interactive electronic display that provides a user input/output interface, controlled responsively to particular characteristics of touch interactions with the display. The characteristics, which may include location information of a user's touch in terms of azimuth angle and distance of the touch with respect to a camera, are determined using optical techniques that add little to the cost, size and complexity of the display.

Particular implementations of the subject matter described in this disclosure can be implemented to realize one or more of the following potential advantages. Relative to the prior art, the presently disclosed techniques enable determination of a touch location on an interactive display to be made using image data from a single camera that is disposed coplanar with or behind the display, notwithstanding that the interactive display may be a large area display screen. As a result of the presently disclosed techniques, very small and inexpensive cameras may be used to accurately determine the location of the object in optical contact with a front surface of the display.

One innovative aspect of the subject matter described in this disclosure can be implemented in an arrangement of an interactive display, including a cover glass having a front surface that includes a viewing area, a light source, a light turning arrangement and at least one camera. The camera, being disposed outside the periphery of the viewing area coplanar with or behind the cover glass, receives scattered light resulting from interaction, with an object, of light outputted from the interactive display, the outputted light being received by the light turning arrangement from the light source and turned, by the light turning arrangement, in a direction substantially orthogonal to the viewing area. The camera, which may be an IR sensitive, VGA micro camera, may output image data from which the location(s) of a touch or a simultaneous, multiple touches may be determined. The disclosed techniques avoid adding significant bezel height around the outside of the display while enabling location(s) of touch(es) to be accurately determined and minimizing effects of occlusion when two or more touches are occurring simultaneously.

In some implementations, an apparatus or electronic device may cooperate with the interactive display to provide an input/output (I/O) interface to a user of the apparatus. The interactive display has a front surface that includes a viewing area. The electronic device may include the interactive display or be electrically or wirelessly coupled to the interactive display. The apparatus may include a processor, a first planar light guide, an infrared (IR) light source, and one or more IR cameras. The first planar light guide may be disposed proximate to and behind the front surface. A second planar light guide may be disposed behind the first planar light guide. In some implementations, the IR light source may be disposed outside the periphery of the planar light guide and be optically coupled with an input of the second planar light guide. The second planar light guide may include a first light-turning arrangement that outputs reflected light, in a direction having a substantial component orthogonal to the front surface, by reflecting light received from the IR light-emitting source so as to illuminate an area above the display. When an object such as a user's finger or a hand held object contacts the front surface of the display, IR light scattered from the object may undergo total internal reflection (TIR) within the first planar light guide. At least some of the IR light, having undergone TIR, may reach the one or more of the IR cameras. The cameras may detect such TIR'd light and output to the processor, image data of the detected TIR'd light. The processor may recognize, from the image data, an instance and location of a user touch, and may control one or both of the interactive display and the electronic device, responsive to the user touch. A better understanding of the term "planar light guide" as the term is used herein and in the claims, may be obtained by referring to application Ser. No. 13/480,377, "FULL RANGE GESTURE SYSTEM", assigned to the assignee of the present invention, the disclosure of which is hereby incorporated by reference into the present application in its entirety for all purposes.

FIG. 1 illustrates a simplified block diagram of an interactive display, according to an implementation. An interactive display 100 includes a display cover glass 165 (FIG. 2) with a front surface 167 (FIG. 2) that includes a viewing area 101. The electronic display 100 includes at least one photosensing element 133 that is configured to detect light. The photosensing element 133 may include, for example, a two dimensional pixel array with a lens, pinhole, or grating ("cameras"). As will be explained in more detail hereinbelow, the photosensing element 133 may detect scattered light that results from interaction of light with an object 150 (FIG. 2) when the object 150 is at least partially in optical contact with the front surface 167.

The photosensing element 133 may output, to a processor 1004, image data. In some implementations, for example, the photosensing element 133 may be or include a camera and may output 2-d image data for a number of image pixels to the processor 1004. The processor 1004 may be communicatively coupled with the photosensing element 133 and with other elements of the interactive display 100. In some implementations, the processor 1004 may be an integral part of the electronic display 100. In other implementations, as suggested by FIG. 1, the processor 1004 may be configured separately from the electronic display 100. In some implementations, the processor 1004 may be remotely located in, for example, a remote server. In some implementations, the processor 1004 may be communicatively coupled with an electronic device 1005. The processor 1004 may be configured to recognize, from the image data, an instance and location of a user touch, and may control one or both of the interactive display 100 and the electronic device 1005, responsive to the user touch.

Figure 2:
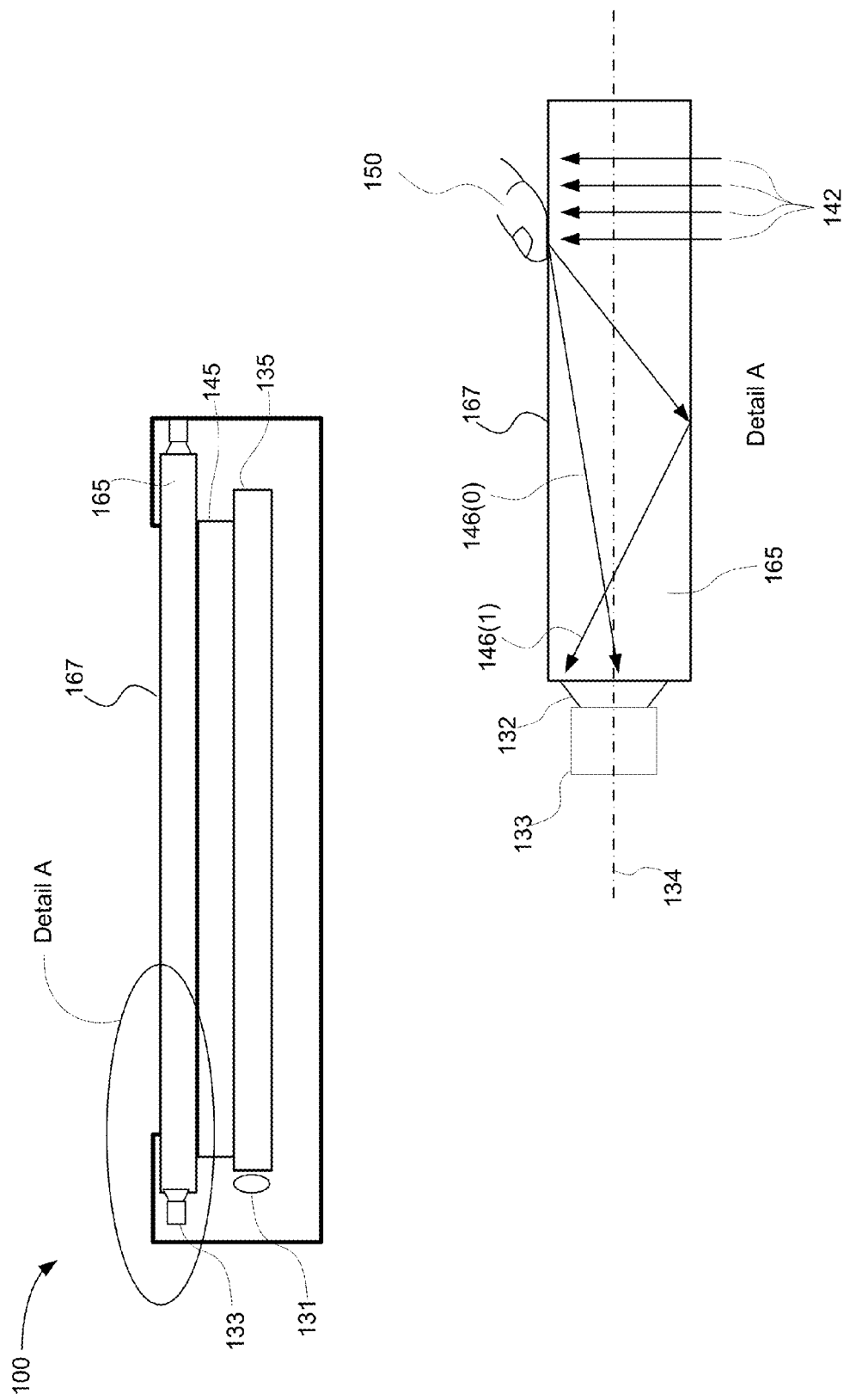
FIG. 2 illustrates a cross-sectional elevation view of the interactive display according to an implementation.

FIG. 2 illustrates a cross-sectional elevation view of the interactive display according to an implementation. In the illustrated implementation, the interactive display 100 includes a first planar light guide 165 (which may be referred to herein also as a "cover lens" or a "cover glass" that may be disposed over a display on a mobile device, monitor, or television, for example). The first planar light guide 165 may be disposed proximate to and behind a front surface 167 of the interactive display 100. A second planar light guide 135 (which may be referred to herein also as a "backlight") may be disposed behind the first planar light guide 165. In the illustrated implementation, a display layer 145 is disposed between the first planar light guide 165 and the second planar light guide 135. As shown in Detail A of FIG. 2, the backlight 135 may be configured to emit light 142 in a direction substantially orthogonal to the front surface 167. The light 142 may include visible and/or infrared light.

In the illustrated implementation, light source 135 is configured as a back light (i.e., the light source 135 is "behind" display layer 145, such that the display layer 145 is disposed between the light source 135 and the first planar light guide 165). In other implementations, however, the light source 135 may be configured as a front light (i.e., the light source 135 may be "above" display layer 145, such that the light source 135 is disposed between the display layer 145 and the first planar light guide 165). More generally, it will be appreciated that the light source 135 may be or include a backlight of a liquid-crystal or field sequential color display, the front-light of a reflective display (e.g. an interferometric modulator (IMOD) display), or light emitted by an emissive display (e.g. organic light emitting diode display), or an infrared light emitted underneath and through an art-work area of the cover glass 165 that is opaque to visible light.

In the illustrated implementation, the interactive display 100 includes a light source 131 and a photo sensing element 133. The light source 131 may be, for example, a light emitting diode (LED). In some implementations, the light source 131 includes one or more IR light sources that may emit infrared, red, blue, green, or another color or combination of colors, or white light. In some implementations, the light source 131 includes a plurality of IR LEDs disposed around a perimeter of the second planar light guide 135. The plurality of IR LEDs may be interspersed with visible LEDs that make up part of the backlight of the interactive display 100.

Referring now to Detail A of FIG. 2, it should be noted that the photosensing element 133 may be or include a camera, including a lens 132 having an optical axis 134. In some implementations, the photosensing element 133 may be disposed such that the optical axis 134 is approximately parallel to the front surface 167. The camera 133, in some implementations, may be or include a video graphics array (VGA) micro camera. The camera may be a black-and-white camera and may be appropriately filtered so as to receive substantially only IR light. In some implementations, the VGA micro camera may include a lens approximately 500 µm diameter and be included in a sensor package of less than 4 mm. As a result, camera 133 maybe located in a coplanar arrangement with the first light guide 165 without adding appreciably to a stack height of the interactive display 100.

As indicated above, in some implementations, the light source 131 may be disposed near a periphery of the second planar light guide 135. In such implementations, the second planar light guide 135 may include a light turning arrangement that reflects light received from the light source 131 in a direction having a substantial component orthogonal to the front surface. Irrespective of where the light source 131 is disposed, referring still to Detail A of FIG. 2, light 142 may pass through the first planar light guide 165 and interact with an object 150. The object 150 is at least partially in optical contact with the top surface of the first planar light guide 165. The object 150 may be a finger or other appendage of the user or a hand held object, such as a stylus, for example. Interaction of the reflected light 142 with the object 150 may produce scattered light 146. Some of the scattered light 146, as illustrated by ray trace 146(0) may travel to the camera 133 and be detected by camera 133 without being internally reflected by the planar light guide 165. At least some of the scattered light 146 may undergo TIR. For example, as illustrated by ray trace 146(1) some of the scattered light may undergo a single internal reflection before being detected by the camera 133. It will be appreciated that some of the scattered light may undergo two, three or more internal reflections before being detected by the camera 133. The camera 133 may output image data of the detected IR light to the processor 1004 (FIG. 1).

The processor 1004 may recognize, from the output of the camera 133, an instance and location of a user's touch, more particularly, a location of the object 150. As described hereinbelow, a single camera 133 may be sufficient to determine both azimuthal angle with respect to an optical axis of the camera 133, and a distance or range from the camera 133.

Figure 3:
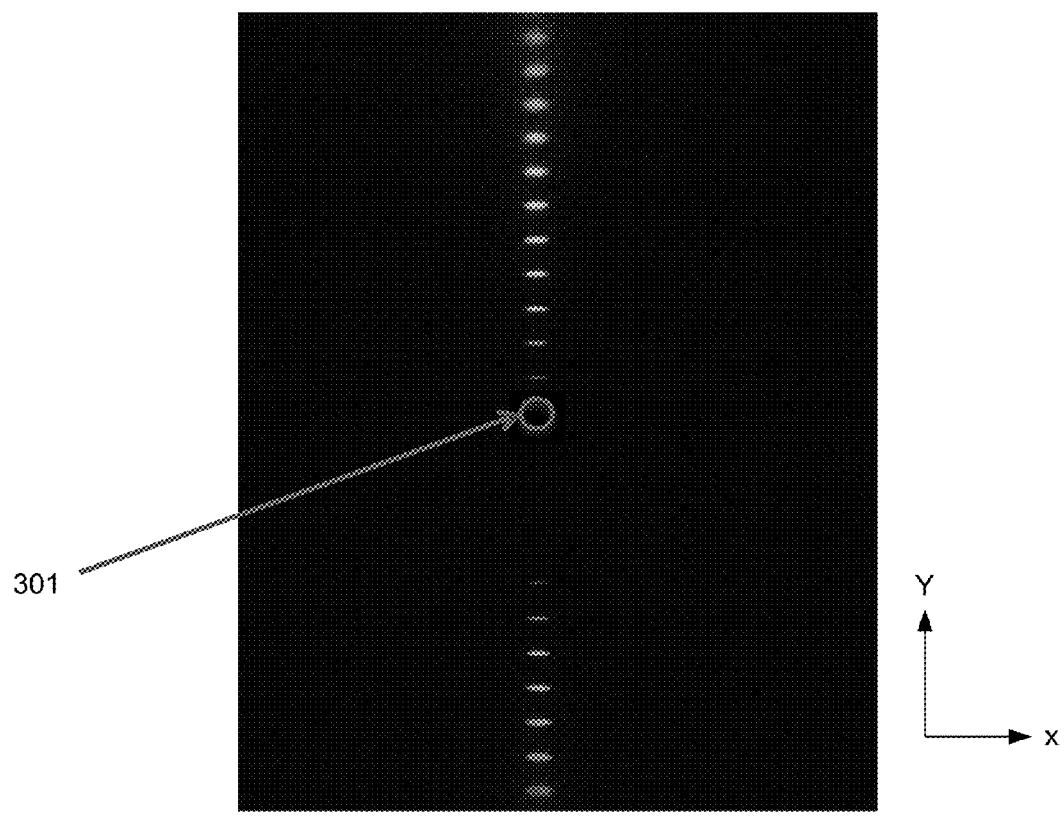
FIG. 3 illustrates an example of the kaleidoscope effect.

Referring still to Detail A of FIG. 2, although two ray traces 146(0) and 146(1) are illustrated, it will be appreciated that multiple discrete reflections of an image of the object 150 may be detected by the camera 133. This may be referred to herein as the kaleidoscope effect. FIG. 3 illustrates an example of the kaleidoscope effect. More particularly, FIG. 3 illustrates an example image from the camera 133 of a single finger touch at the middle of the field of view of the camera 133. In the illustrated example, the direct image of the touch is at location 301. Bright marks above and below the location 301 result from light rays that have undergone one or more internal reflections between the object 10 and the camera 133. A distance between the location of the object 10 and the camera 133 may be determined by analysis of the number and spatial separation of the kaleidoscope reflections along the vertical (Y) axis. This analysis may be done by performing a discrete Fourier transform on the image data. Azimuthal angle to the touch may be determined by where detected light is located in the horizontal (X) axis.

Figure 4:
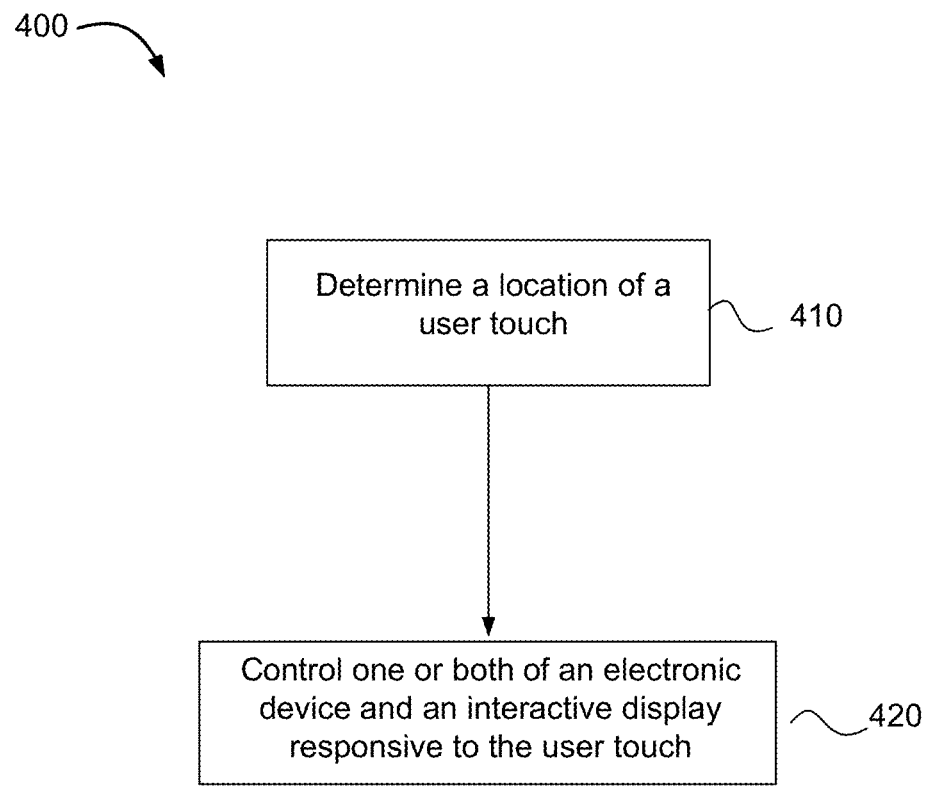
FIG. 4 illustrates a process flow diagram for controlling an electronic device and/or an interactive display, responsive to a user touch.

FIG. 4 illustrates a process flow diagram for controlling an electronic device and/or an interactive display, responsive to a user touch. A processor incorporated into and/or communicatively coupled with the interactive display may be configured to execute the process 400. In some implementations, the interactive display 100, including the camera 133 may be configured to execute the process 400 in cooperation with processor 1004. The process 400 may begin at block 410 with determining a location of a user touch. The location may be determined by the processor determining, from an output of the camera, one or both of an azimuthal angle of the object with respect to an optical axis of the camera and a distance of the object from the camera. Where the interactive display includes a cover glass having a front surface that includes a viewing area, the output of the camera may result from emitting light from a light source into a light turning arrangement, the light source being disposed outside a periphery of the viewing area. The emitted light may be reflected by the light turning arrangement in a direction having a substantially orthogonal to the viewing area. The camera may receive scattered light resulting from interaction of the reflected light with an object, and output corresponding image data to the processor.

At block 420, the processor may, responsive to the user touch, control one or both of the electronic device and the interactive display.

Figure 5:
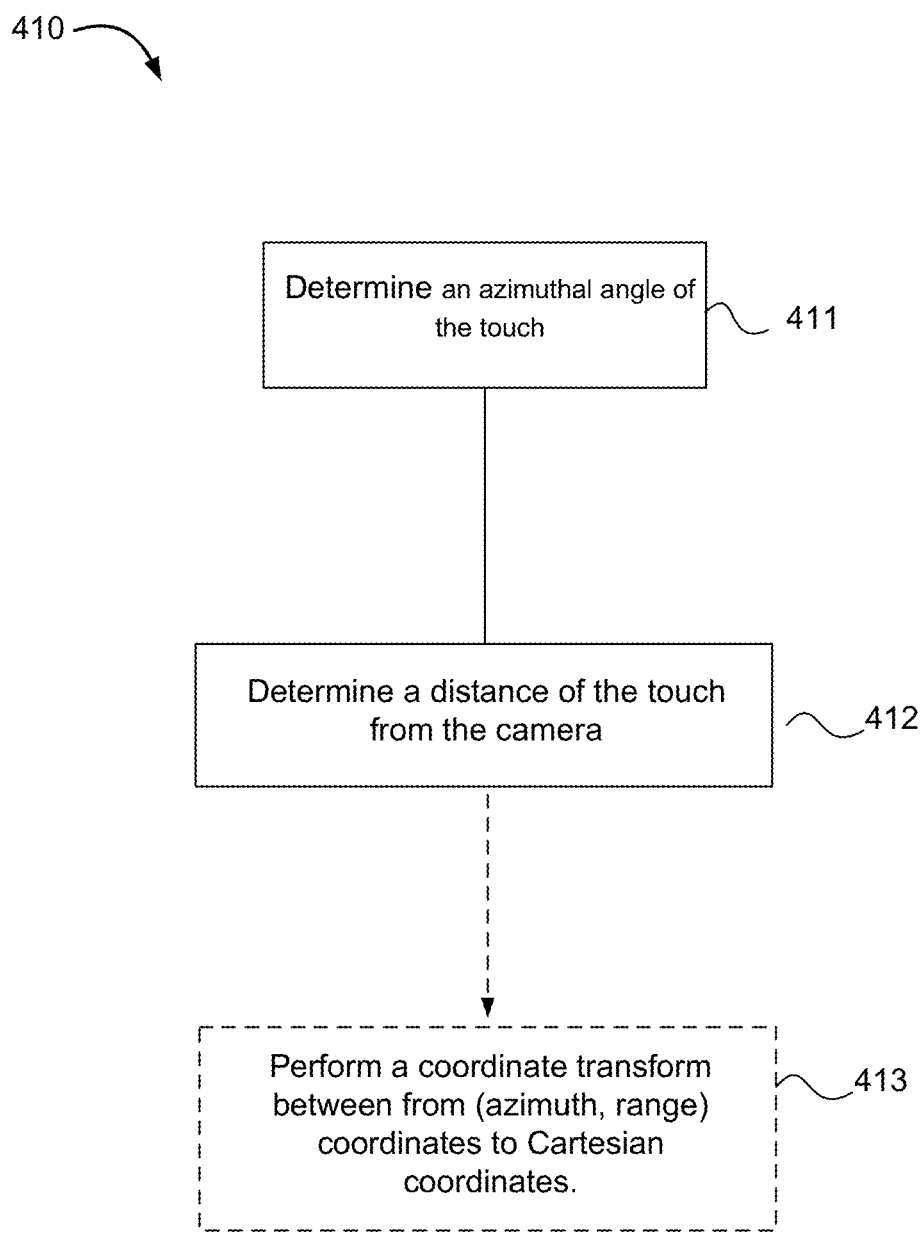
FIG. 5 illustrates a process flow diagram for determining a location of a user touch from an output of at least one camera in accordance with some implementations.

FIG. 5 illustrates a process flow diagram for determining a location of a user touch from an output of at least one camera in accordance with some implementations. The process 410 may begin at block 411 with determining an azimuthal angle of the touch with respect to an optical axis of the camera. In some implementations, the azimuthal angle may be determined by identifying a pixel location, within image data output by the camera, that is proximate to a center location of the touch. For example, the pixel location corresponding to a peak optical intensity along a line scan of the image data may be identified. In some implementations, the identified pixel location may be mapped to an angle with respect to the optical axis of the camera, taking into account characteristics of any lens system associated with the camera.

The process 410 may continue, at block 412 with determining a range distance between the touch and the camera. The range may be determined by analyzing the image data to characterize one or more parameters of the kaleidoscope reflections such as the number, separation, or frequency of the reflections. The characterized parameter(s) may be mapped to the range distance.

Optionally, the process may continue, at block 413, with performing a coordinate transform from (azimuth, range) coordinates to Cartesian (x,y) coordinates.

Figure 6:
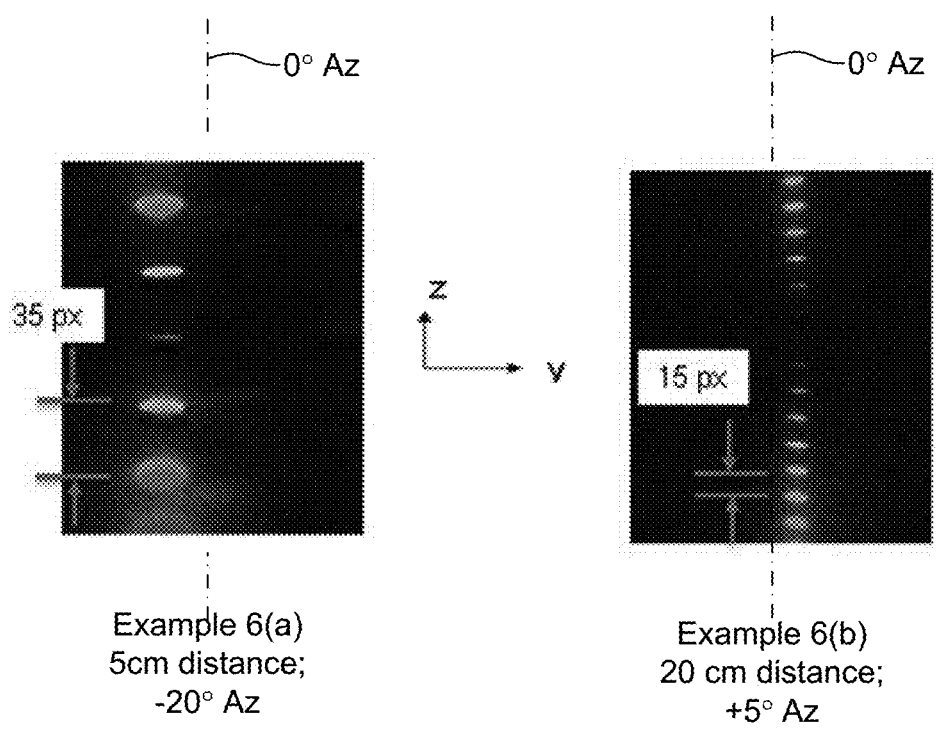
FIG. 6 illustrates examples of kaleidoscope image data.

FIG. 6 illustrates examples of kaleidoscope image data. Example 6(a) shows kaleidoscope reflection images resulting from a touch located at a distance of 5 cm from the camera, and at an azimuth angle of −20° with respect to an optical axis of the camera. Example 6(b) shows kaleidoscope reflection images resulting from a touch located at a distance of 20 cm from the camera, and at an azimuth angle of +5° with respect to the optical axis.

It will be appreciated that an offset distance of a reflected image in the Y axis direction from the camera optical axis may be readily mapped to an azimuth angle. Separation distance between reflected images may likewise be mapped to a range distance from the touch to the camera. In the illustrated Example 6(a), a 35 pixel separation between reflected images has been mapped to a 5 cm distance between the touch and the camera, whereas in the illustrated example 6(b), a 15 pixel separation between reflected images has been mapped to a 20 cm distance between the touch and the camera.

Figure 7:
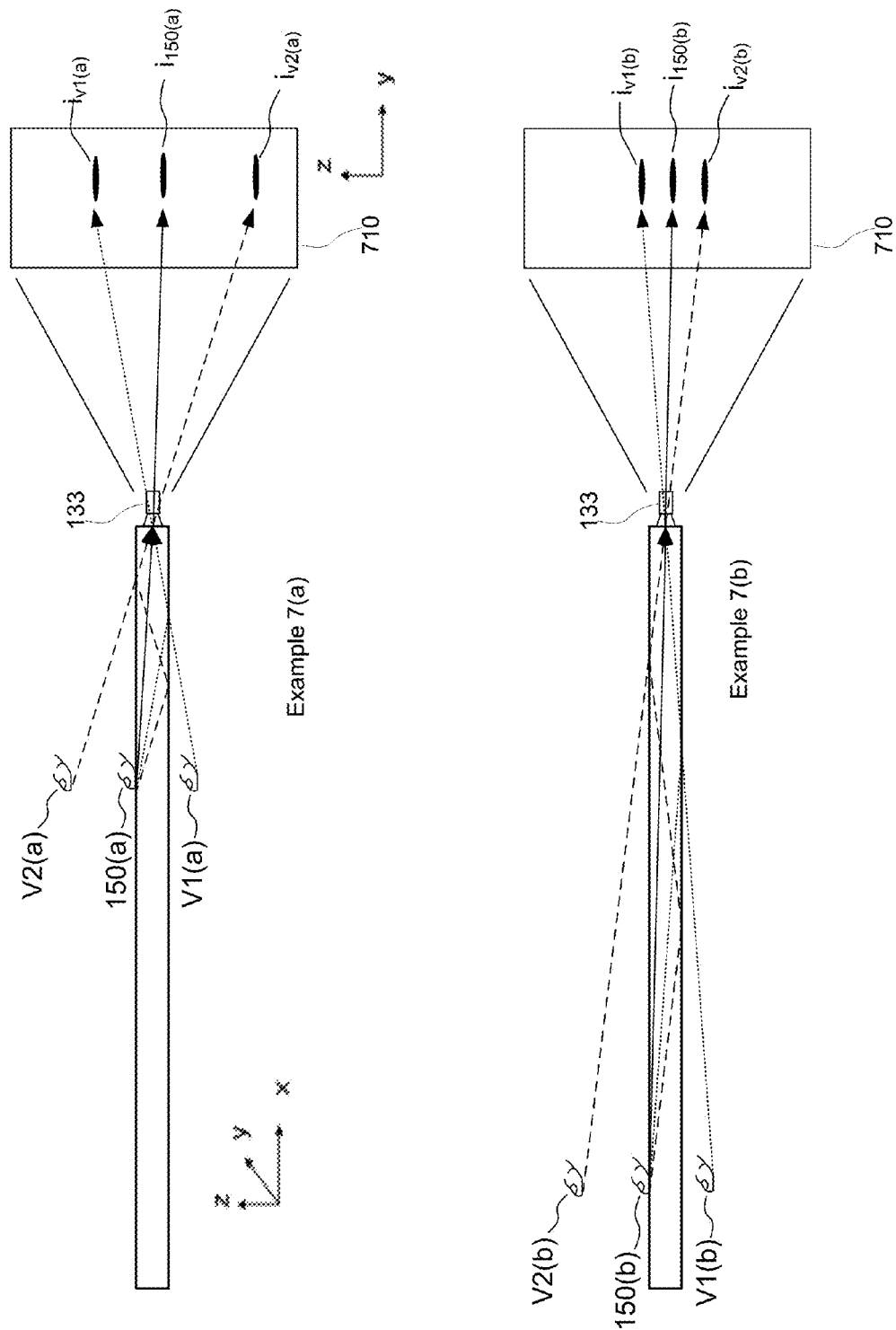
FIG. 7 illustrates the relationship between kaleidoscope reflection image separation and range distance.

FIG. 7 illustrates the relationship between kaleidoscope reflection image separation and range distance. More particularly, FIG. 7 illustrates how each of multiple images registered within a field of view 610 of the camera 133 corresponds to light that is scattered from an object 150 at a different angle that may be related to a respective virtual object location. For example image $i_{550}$ corresponds to a direct image of object 150. Image $i_{v1}$ results from light rays that have undergone a single internal reflection and corresponds to a virtual object location v1. Image $i_{v2}$ results from light rays that have undergone two internal reflections and corresponds to a virtual object location v2. Although for clarity of illustration only three images, images $i_{550}$, $i_{v1}$, and $i_{v2}$, are depicted in each of examples 7(a) and 7(b), a substantially larger number of images may ordinarily be expected to result from the kaleidoscope effect.

Comparing example 7(a) with example 7(b), it may be observed that, where the location of a touch 150(a) is closer to the camera 133 than the location of a touch 150(b), the separation distance between kaleidoscope reflection images in example 7(a) is larger than the separation distance between kaleidoscope reflection images in example 7(b). As a result, a range distance between a touch and the camera may be quantitatively obtained by measuring the separation distances between kaleidoscope reflection images resulting from the touch.

Figure 8:
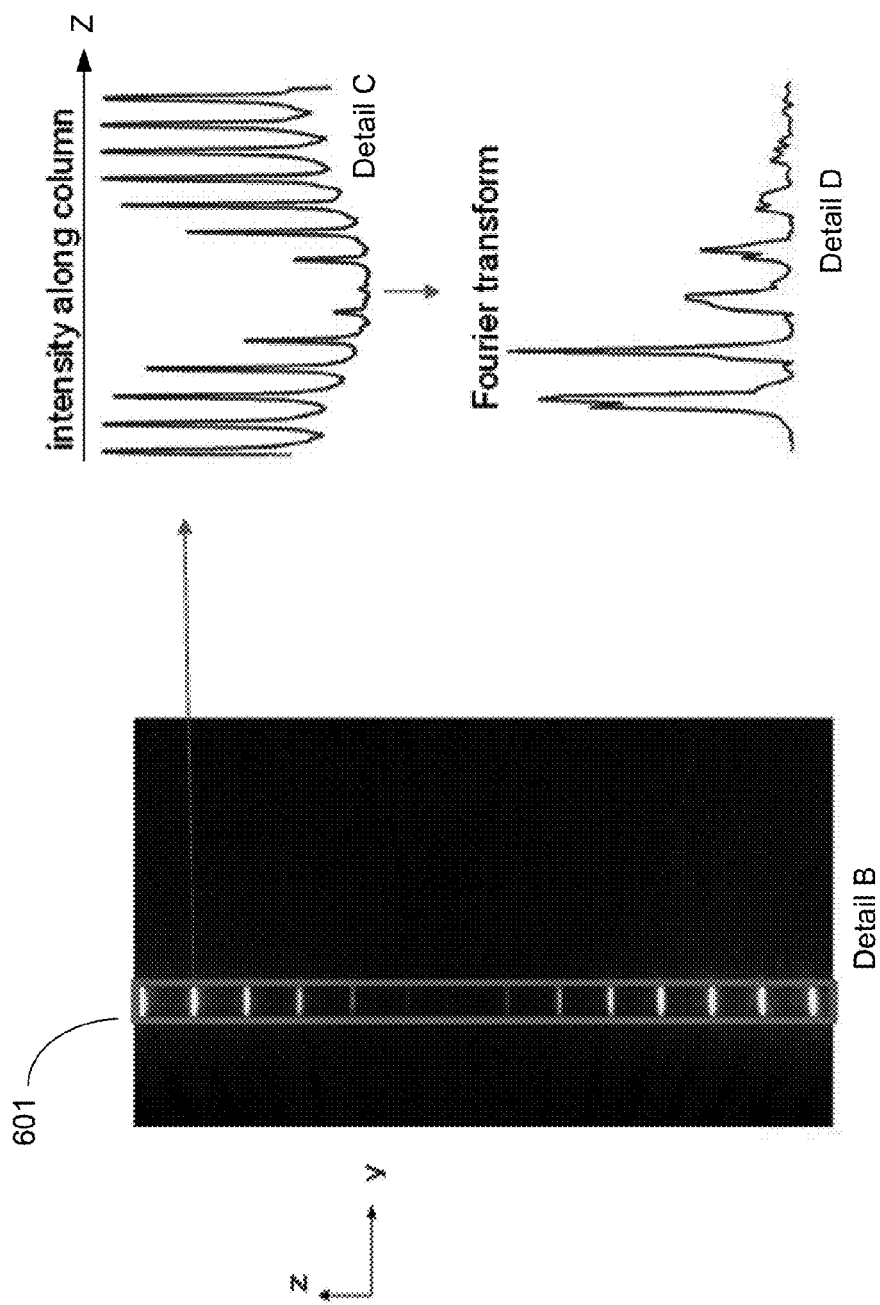
FIG. 8 illustrates aspects of obtaining range information from the kaleidoscope reflection images according to some implementations.
Figure 9:
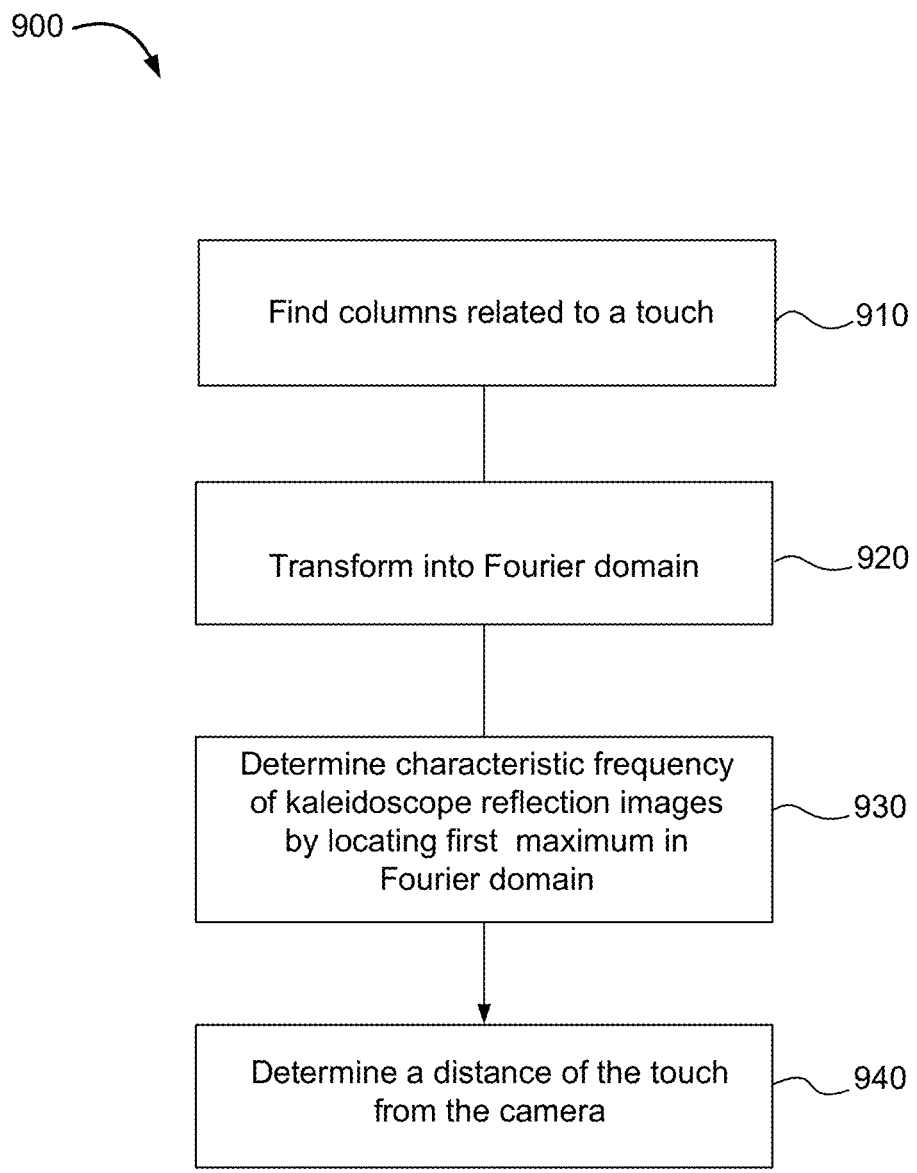
FIG. 9 illustrates a process flow diagram for determining a range distance of a user touch from a camera in accordance with some implementations.

FIG. 8 illustrates aspects of obtaining range information from the kaleidoscope reflection images according to some implementations. FIG. 9 illustrates a process flow diagram for determining a range distance of a user touch from a camera in accordance with some implementations. Referring first to FIG. 8, Detail B shows an example of kaleidoscope reflection images located within a region 601. The region 601 may include a number of columns of pixels, including image data related to an instance of a user's touch. Pixels outside the region 601 are unrelated to the user's touch.

Referring now to FIG. 9, a method 900 for determining range distance of a user's touch is illustrated. For a given frame of image data, the frame including rows and columns of pixels, the method may begin at block 910 with identifying those columns of pixels containing image data related to a touch. In the example illustrated in FIG. 8, such columns are those included in region 601. In some implementations, a column having the highest average intensity may be selected. In some implementations, an average over two or more neighboring columns may be taken. As shown in Detail C of FIG. 8, image intensity along the Z axis within region 601 may vary substantially.

Referring again to FIG. 9, the method may continue, at block 920, with performing a Fourier transform on the intensity data illustrated in Detail C of FIG. 8. The resulting Fourier domain plot, shown in Detail D of FIG. 8, may readily yield a characteristic frequency of the kaleidoscope reflection images. More particularly, the frequency at which the first maximum in the Fourier domain plot occurs will be known to correspond to the characteristic frequency of the kaleidoscope reflection images. Accordingly, method 900 contemplates, at block 930, locating the first maximum. The determined characteristic frequency may in turn be used, at block 940 of FIG. 9, to determine a range distance of the touch from the camera. For example, the range distance 'd' may be equated to $2fD/\Delta$, f is the focal length of the camera, D is the thickness of the first planar light guide and $\Delta$ is the distance between adjacent kaleidoscope reflection images.

In some implementations, techniques are contemplated for improving the accuracy and reliability of touch location determination, particularly for implementations in which it is desirable to detect and distinguish between multiple, simultaneous or near simultaneous touches ("multi-touch" implementations). Multi-touch implementations require detection and location determination of multiple image intensity peaks. The presently disclosed techniques provide for accurate and reliable touch location determination, notwithstanding that a shape of any individual peak is likely to be nonsymmetrical and may depend on characteristics of the object being detected as well as placement characteristics of the object.

Figure 10:
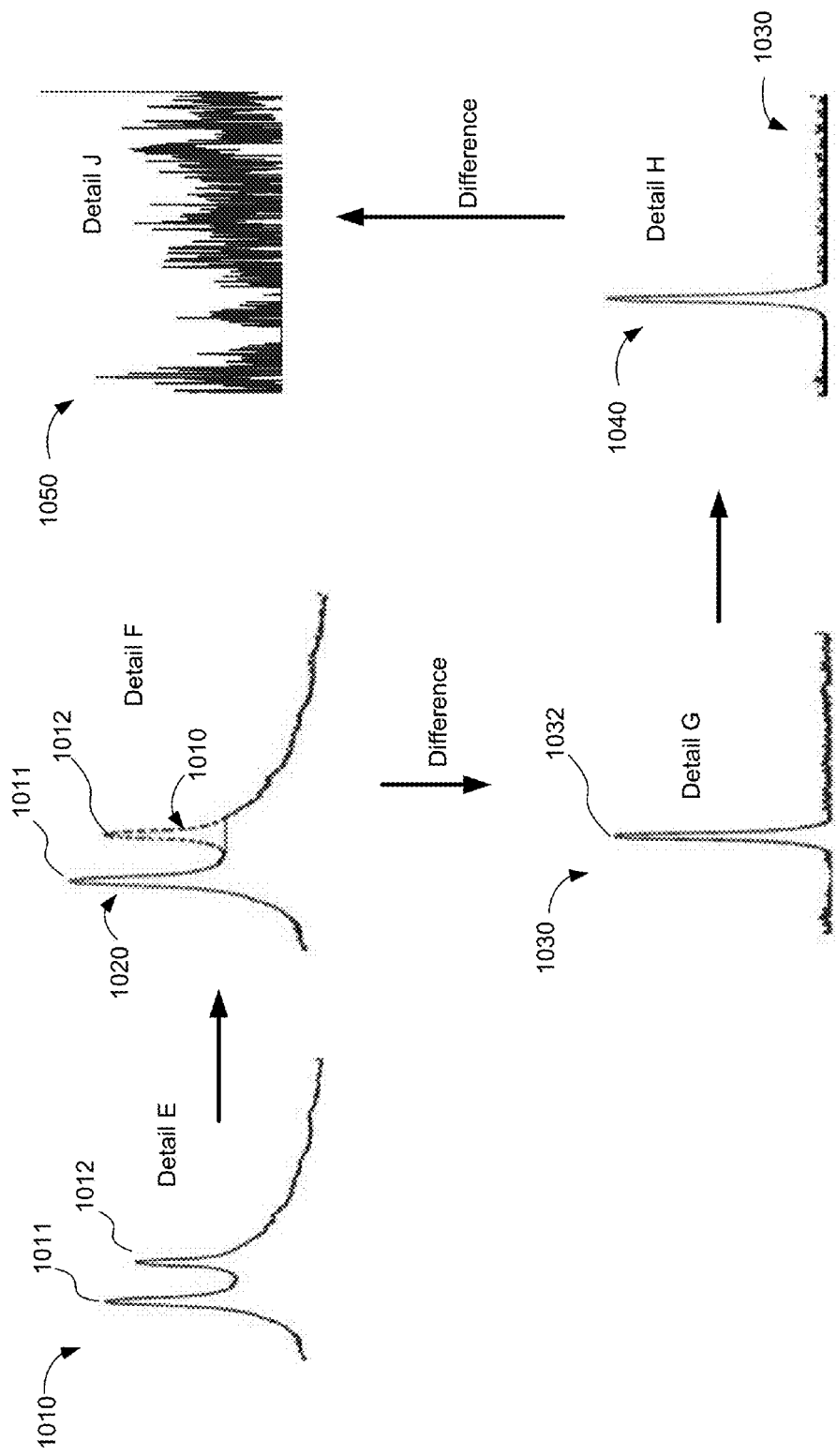
FIG. 10 illustrates aspects of obtaining location information for a multi-touch implementation.
Figure 11:
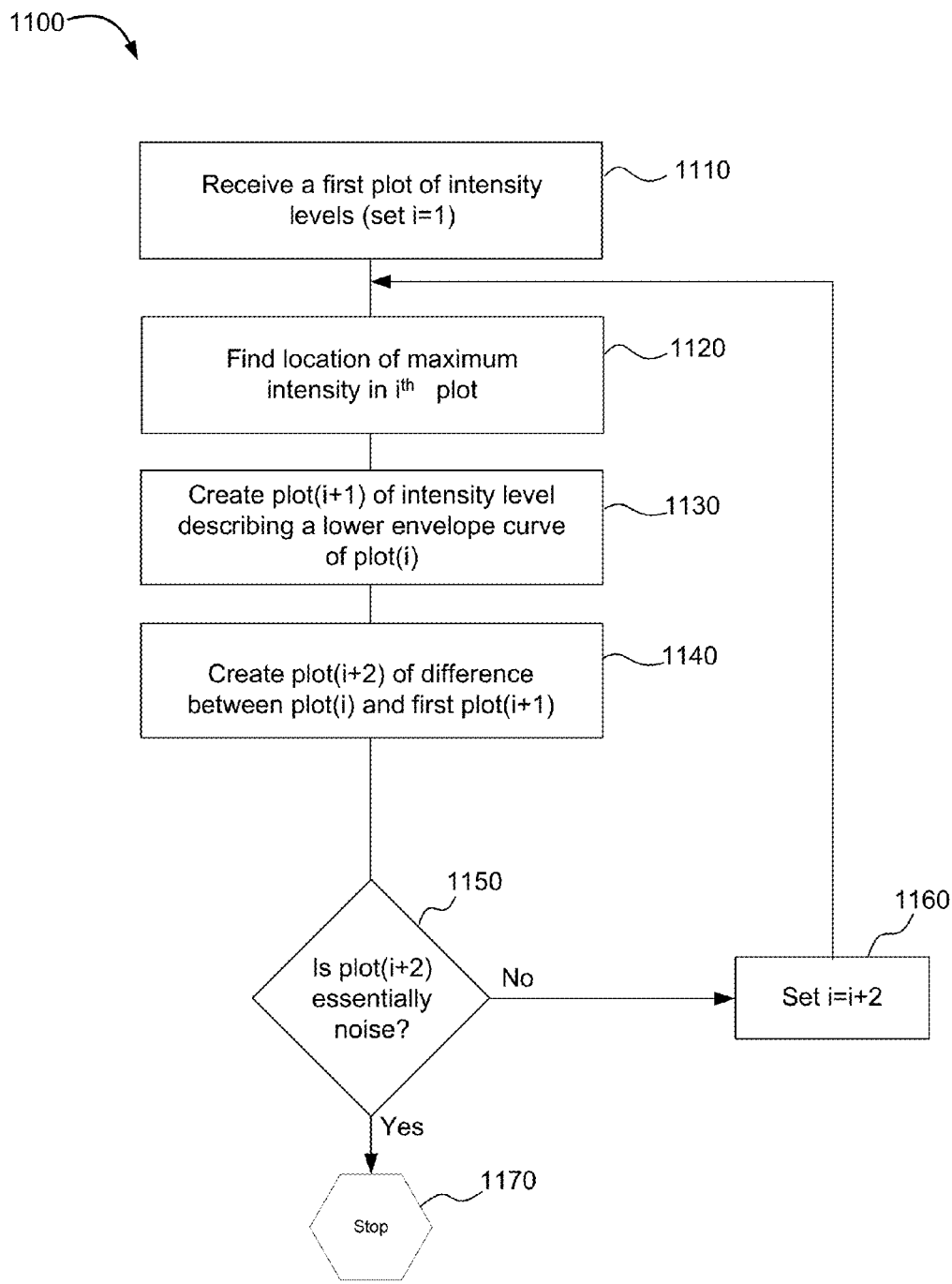
FIG. 11 illustrates a process flow diagram for processing image data in a multi-touch implementation.

FIG. 10 illustrates aspects of obtaining location information for a multi-touch implementation. FIG. 11 illustrates a process flow diagram for processing image data in a multi-touch implementation. Referring first to FIG. 10, Detail E shows a plot 1010 of image intensity data as a function of position along a column or row of pixels. Each of the indicated intensity peaks 1011 and 1012 may represent a location of a respective touch. Referring now to FIG. 11, a method 1100 may start, at block 1110 with receiving a first plot of intensity levels, and with setting an index counter 'i' to one. The received first plot of intensity levels include data of the form illustrated as the plot 1010 in Detail E of FIG. 10.

Referring again to FIG. 11, method 1100 may continue, at block 1120, with finding a location of maximum intensity in the $i^{th}$ (first) plot. In the illustrated example of FIG. 10, Detail E, plot 1010 represents the first plot, and the maximum intensity may be observed to occur at peak 1011.

Referring again to FIG. 11, method 1100 may continue, at block 1130, with creating a second plot (plot(i+1)) of intensity level describing a lower envelope curve of plot(i). As used herein and in the claims, the term "lower envelope curve" describes a function that never increases when going away from the maximum intensity position and is always less than or equal to the preceding curve (plot(i)). Thus, referring now to Detail F of FIG. 10, plot 1020 represents the second plot. The second plot 1020 excludes the (dashed) portions of the first plot 1010 because the dashed portions have a greater intensity than the lower envelope curve values. As a result, intensity data related to intensity peak 1012, and other intensity values that exceed the above defined lower envelope curve, are excluded from the second plot 1020.

Referring again to FIG. 11, method 1100 may continue, at block 1140, with creating a plot(i+2) describing a difference between plot(i+1) and plot(i). An example of a resulting difference curve (plot (i+2)) is illustrated as third plot 1030 in detail G of FIG. 10. It may be observed that a distinct difference peak 1032 occurs at a location corresponding to the location of the intensity peak 1012. In the illustrated example, portions of the plot third 1030 unrelated to the difference peak 1032 correspond to low-level noise.

Referring again to FIG. 11, method 1100 may continue, at block 1150, with making a determination whether or not plot (i+2) relates essentially only to noise. If the determination at block 1150 is that the plot(i+2) relates essentially only to noise, the method may stop (block 1170). On the other hand, if the determination at block 1150 is that at least some of the plot(i+2) is not related to noise, the index i may be set to i+2 (block 1160), and the process may repeat 1120 through 1150.

Referring again to FIG. 10, it should be appreciated that the third plot 1030 includes data not related to noise (i.e., the difference peak 1032). Accordingly, a determination made according to block 1150 as applied to the third plot 1030 may be to reset the index i=i+2 (block 1160), and repeat process blocks 1120 through 1150. More particularly, referring still to FIG. 10, a fourth (solid line) plot 1040 may be created by executing blocks 1120 and 1130 of method 1100. Thus, using the above defined lower envelope level, the fourth plot 1040 excludes the (dashed) portions of the third plot 1030.

A difference computed (in accordance with block 1140) between the third plot 1030 and the fourth plot 1040 is depicted as fifth plot 1050 in Detail J of FIG. 10. It will be appreciated that fifth plot 1050 is essentially related only to noise. Accordingly, a determination made according to block 1150 as applied to fifth plot 1050 may be to stop the method 1100 (block 1170).

The method 1100 has been shown to reliably and accurately identify and locate multi-touch inputs. Although for clarity of illustration intensity plots shown in FIG. 10 are along a single axis, the above disclosed techniques may be applied to a 2-D contour. The above described method may be considered non-parametric because it does not require an assumption of the peaks' shapes as a function of parameters such as position and variance as may be required in, for example, a Gaussian mixture model. As a result, the above described method is robust and needs little tuning Computationally efficiencies are also obtained because the operations are simple: maximum-finding and subtraction. The above described method may also be implemented in parallel code.

Figure 12:
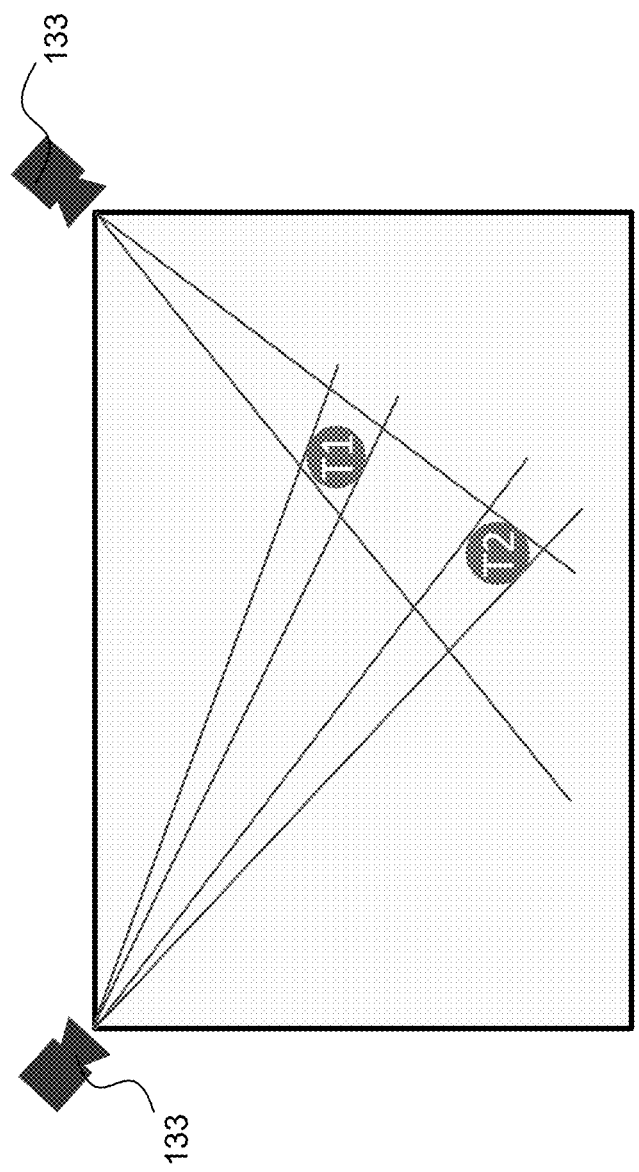
FIG. 12 illustrates plan view of an interactive display according to an implementation.

FIG. 12 illustrates plan view of an interactive display according to an implementation. In the illustrated implementation, at least two cameras 133 may be provided, which may provide for a more accurate location determination of a touch and/or may minimize effects of occlusion when two or more touches (T1 and T2) are occurring simultaneously.

Figure 13:
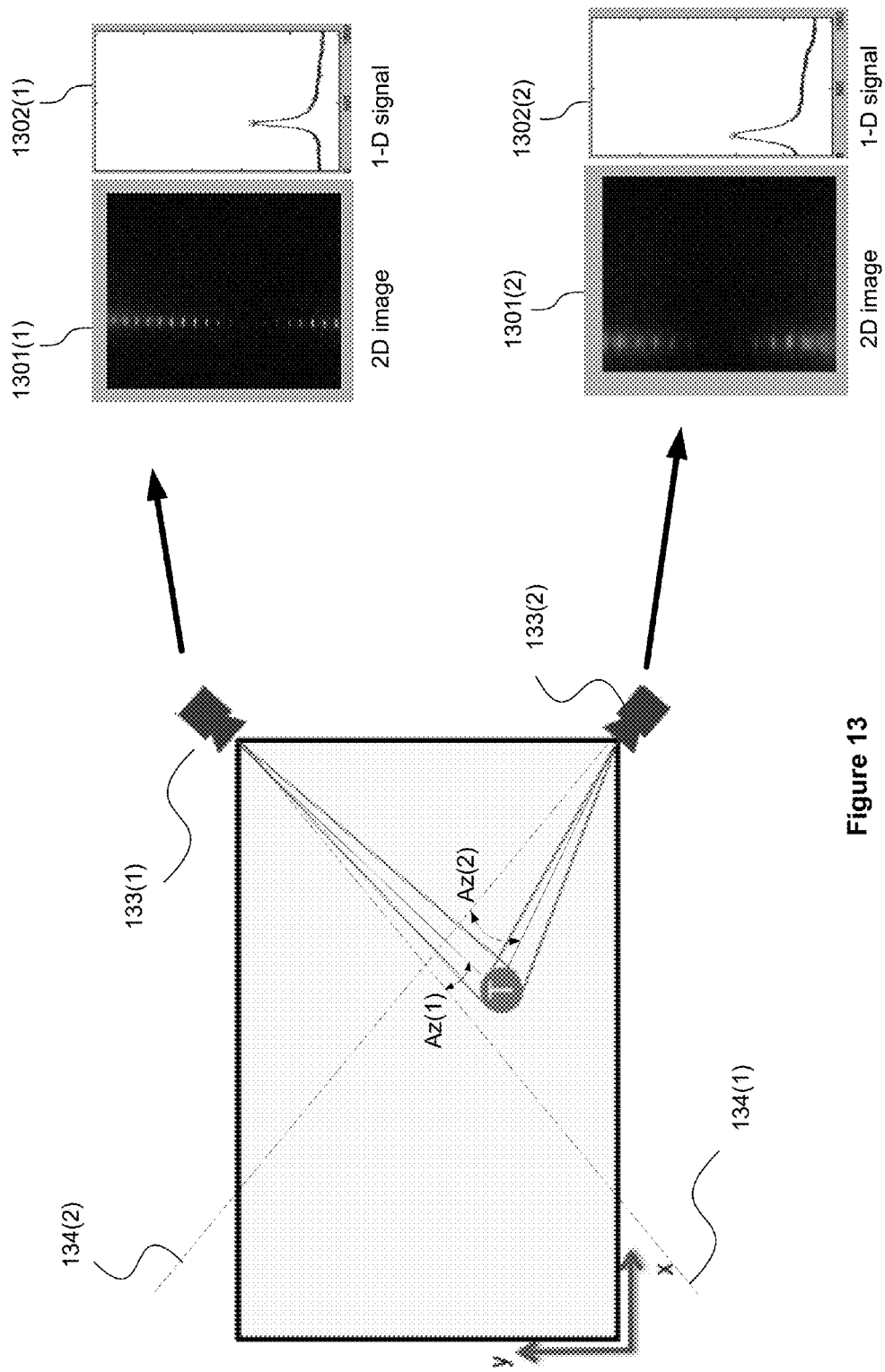
FIG. 13 illustrates aspects of obtaining location information of a touch using at least two cameras.

FIG. 13 illustrates aspects of obtaining location information of a touch using at least two cameras. In the illustrated implementation, each of the camera 133(1) and the camera 133(2) output 2-D image data, including respective kaleidoscope reflection images 1301(1) and 1301(2). Camera 133(1) has an optical axis 134(1) and the camera 133(2) has an optical axis 134(2). An azimuth angle of the touch with respect to each optical axis may be obtained using the techniques disclosed hereinabove. For example, in some implementations, respective 1D signal intensity plots 1302(1) and 1302(2) may be generated to determine the respective azimuth angles Az(1) and Az(2). The determination of the respective azimuth angles Az(1) and Az(2) may then be used to determine, by triangulation of image data, the location of the touch. Although two cameras are depicted in the illustrated implementation, implementations including three or more cameras are also contemplated by the present disclosure.

Figure 14:
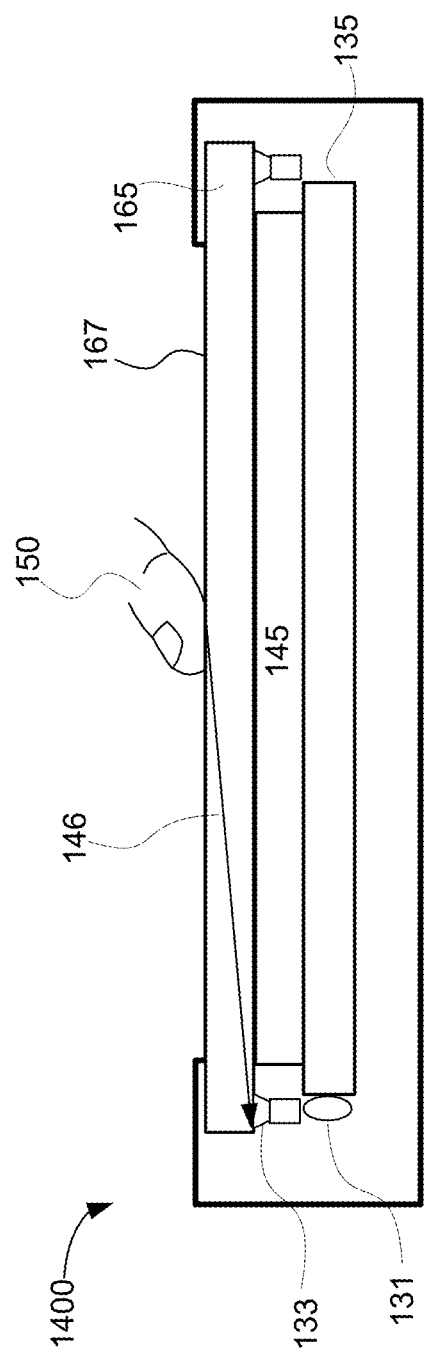
FIG. 14 illustrates a cross-sectional elevation view of an interactive display according to another implementation.

FIG. 14 illustrates a cross-sectional elevation view of an interactive display according to another implementation. In the illustrated implementation, electronic display 1400 includes cameras 133 that are located below the plane of the first planar light guide 165. For example, a prism or other light turning arrangement (not illustrated) may be disposed proximate to an edge of the first planar light guide 165. The prism or other light turning arrangement may redirect the scattered IR light 146 toward the camera 133.

Figure 15:
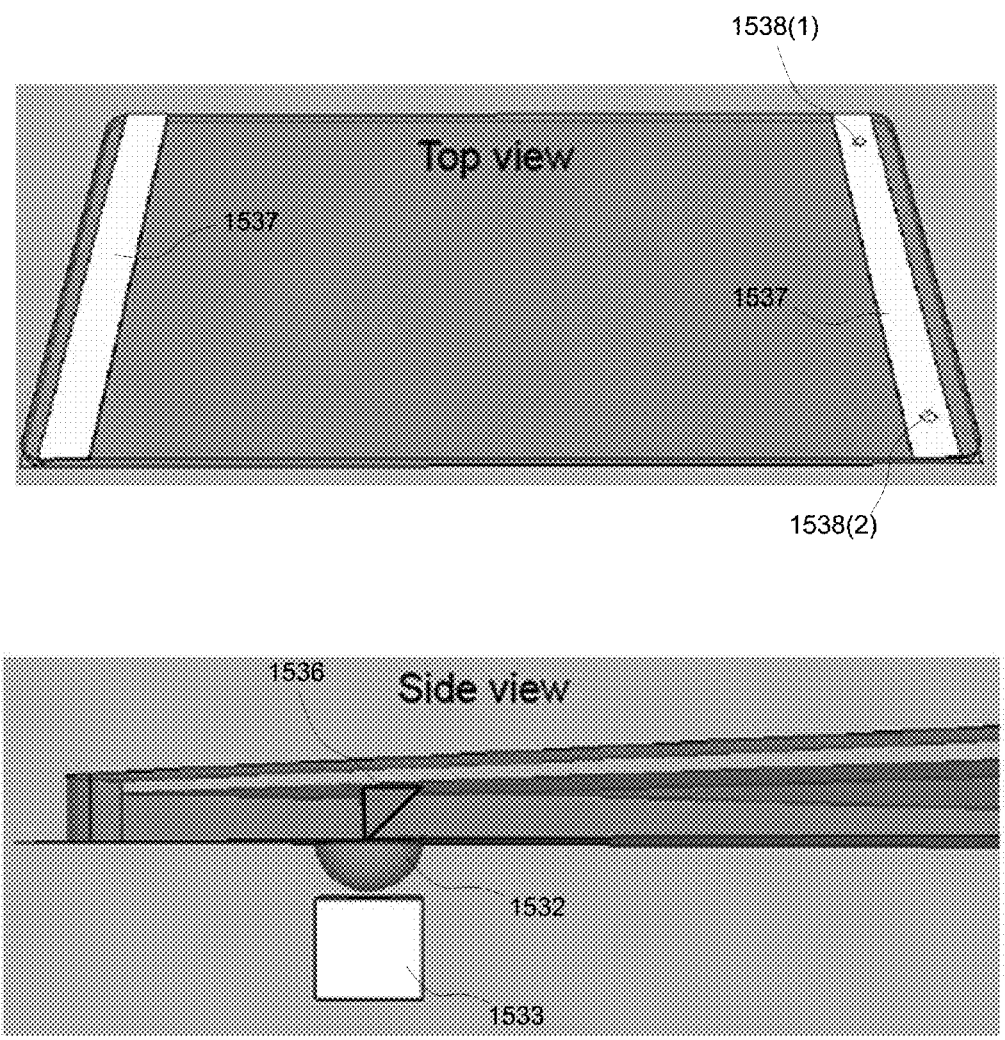
FIG. 15 illustrates an example of an interactive display including a camera located below the display viewing area.

FIG. 15 illustrates an example of an interactive display including a camera located below the display viewing area. In the illustrated implementation, the camera 1533 is optically coupled with a micro lens 1532. A prism 1536 is disposed proximate to an edge of the display viewing area and to the micro lens 1532. As may be observed in the top (perspective) view, artwork 1537 may be arranged proximate to one or more edges of the display viewing area. In some implementations, the prism 1536, micro lens 1532, and camera 1533 may be disposed behind the artwork 1537. For example, in the illustrated implementation, locations 1538(1) and 1538(2) indicate two selected locations behind which respective arrangements of prism 1536, micro lens 1532, and camera 1533 may be disposed.

Figure 16:
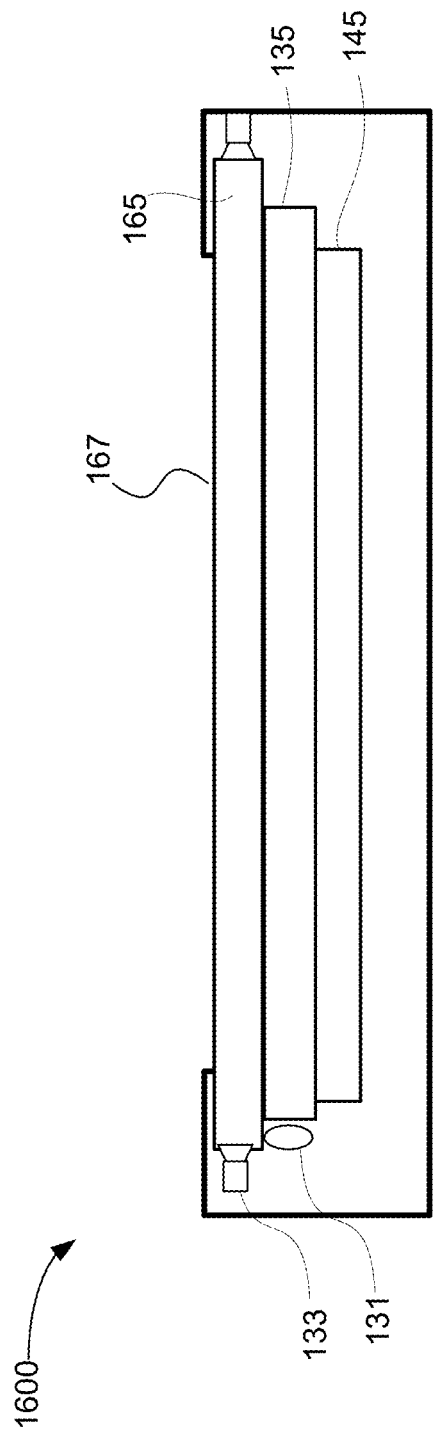
FIG. 16 illustrates an example of an interactive display according to a yet further implementation.

FIG. 16 illustrates an example of an interactive display according to a yet further implementation. In the illustrated implementation, the second planar light guide 135 is disposed between the first planar light guide 165 and the display layer 145. It will be appreciated that in such an implementation, the second planar light guide 135 may function as a front light. The display layer 145 may be a reflective display. For example, the display layer 145 may include an array of interferometric modulators (IMOD's). In some implementations, the second planar light guide 135 may include, a substantially transparent micro-sphere based plastic-frontlight material.

Thus, improved techniques for enabling an interactive display to detect and respond to particular characteristics of touch interactions with the interactive display have been disclosed.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that can be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus comprising:
    an interactive display, including a cover glass having a front surface that includes a viewing area, and providing an input/output (I/O) interface for a user of an electronic device;
    a processor;
    a light source that emits one or both of visible and infrared light; and
    at least a first camera disposed outside the periphery of the viewing area, coplanar with or behind the cover glass; wherein:
        the first camera is configured to receive scattered light from an object in optical contact with the front surface and output image data of the scattered light, the scattered light resulting from interaction, with an object, of light outputted from the interactive display, at least some of the scattered light being received by the cover glass from the object and directed toward the first camera; and
        the processor is configured to determine, from the image data outputted by the first camera, both of an azimuthal angle of the object with respect to an optical axis of the first camera and a distance of the object from the first camera.

2. The apparatus of claim 1, wherein the cover glass includes a first planar light guide, disposed proximate to the front surface, the first planar light guide being configured to receive the scattered light, at least some of the received scattered light undergoing total internal reflection (TIR) within the first planar light guide.

3. The apparatus of claim 2, wherein the light turning arrangement includes:
    a second planar light guide disposed behind the first planar light guide; and
    the outputted light results from the second planar light guide reflecting emitted light from the light source in a direction having a substantial component orthogonal to the front surface.

4. The apparatus of claim 3, wherein the light source is optically coupled with the second planar light guide.

5. The apparatus of claim 3, wherein the interactive display is disposed between the first planar light guide and the second planar light guide.

6. The apparatus of claim 3, wherein the first planar light guides disposed in front of the front surface; the second planar light guide is disposed behind the first planar light guide; and
    the outputted light results from the second planar light guide reflecting emitted light from the light source in a direction having a substantial component orthogonal to the front surface.

7. The apparatus of claim 6, wherein the second planar light guide functions as a front light of the interactive display.

8. The apparatus of claim 1, wherein the outputted light illuminates an area above the interactive display.

9. The apparatus of claim 1, wherein the processor is configured to control one or both of the interactive display and the electronic device.

10. The apparatus of claim 1, wherein the light source is an infrared light source and the interactive display is a liquid crystal display.

11. The apparatus of claim 1, wherein the processor is configured to determine the distance of the touch from the first camera by analyzing image data, output by the first camera, of a plurality of kaleidoscope reflections received by the first camera.

12. The apparatus of claim 11, wherein the processor is configured to determine the distance by analyzing a spatial separation between two or more of the plurality of kaleidoscope reflections.

13. The apparatus of claim 1, wherein the processor is configured to determine the azimuthal angle of the touch of the touch with respect to an optical axis of the first camera by analyzing image data, output by the first camera, of at least one kaleidoscope reflection received by the first camera.

14. The apparatus of claim 1, wherein the viewing area has a diagonal dimension exceeding 24 inches.

15. A method comprising:
    determining, with a processor, a location of a user touch from an output of at least a first camera, and;
    controlling, with the processor, one or both of an electronic device and an interactive display that provides an input/output (I/O) interface for the electronic device, responsive to the determine the location of the user touch, wherein:
        the interactive display includes a cover glass having a front surface that includes a viewing area;

the first camera is disposed outside a periphery of the viewing area, coplanar with or behind the cover glass;

the output of the first camera results from receiving, with the first camera, scattered light from an object in optical contact with the front surface and output image data of the scattered light, the scattered light resulting from interaction, with the object, of light outputted from the interactive display, at least some of the scattered light being received by the cover glass and directed toward the first camera; and the location is determined by the processor determining, from the image data outputted by the first camera, an azimuthal angle of the object with respect to an optical axis of the first camera and a distance of the object from the first camera.

16. The method of claim 15, wherein the determining the location of the user touch includes analyzing image data, output by the first camera, of a plurality of kaleidoscope reflections received by the first camera.

17. The method of claim 16, wherein the determining the distance of the object from the first camera includes analyzing a spatial separation between two or more of the plurality of kaleidoscope reflections.

18. The method of claim 17, wherein the determining the azimuth angle includes analyzing image data, output by the first camera, of at least one kaleidoscope reflection received by the first camera.

19. An apparatus comprising:
an interactive display, including a cover glass having a front surface that includes a viewing area, and providing an input/output (I/O) interface for a user of an electronic device;
a processor;
a light source that emits one or both of visible and infrared light;
and
a first means for detecting light disposed outside the periphery of the viewing area coplanar with or behind the cover glass, the light detecting means being configured to receive scattered light from an object in optical contact with the front surface and output image data of the scattered light, the scattered light resulting from interaction, with the object, of light outputted from the interactive display, at least some of the scattered light being received by cover glass from the object and directed toward the light detecting means, the first light detecting means being configured to output image data, corresponding to the received scattered light, to the processor; wherein:
the processor is configured to determine, from the image data outputted by the light detecting means, an azimuthal angle of the object with respect to an optical axis of the first light detecting means and a distance of the object from the first light detecting means.

20. The apparatus of claim 19, wherein the cover glass includes:
a first planar light guide, disposed proximate to the front surface, the first planar light guide being configured to receive the scattered light, at least some of the received scattered light undergoing total internal reflection (TIR) within the first planar light guide.

21. The apparatus of claim 20, wherein the light turning arrangement includes:
a second planar light guide disposed behind the first planar light guide; and
the outputted light results from the second planar light guide reflecting emitted light from the light source in a direction having a substantial component orthogonal to the front surface.

22. The apparatus of claim 19, wherein the processor is configured to control one or both of the interactive display and the electronic device.

23. A non-transitory computer readable medium having software stored thereon, the software including instructions executable by a processor, the instructions causing the processor to:
determine a location of a user touch from an output of at least a first camera, and;
control one or both of an electronic device and an interactive display that provides an input/output (I/O) interface for the electronic device, responsive to the determined location of the user touch, wherein:
the interactive display includes a cover glass having a front surface that includes a viewing area;
the first camera is disposed outside a periphery of the viewing area, coplanar with or behind the cover glass;
the output of the first camera results from receiving, with the first camera, scattered light from an object in optical contact with the front surface and output image data of the scattered light, the scattered light resulting from interaction, with an object, of light outputted from the interactive display, at least some of the scattered light being received by the cover glass and directed toward the first camera; and
the location is determined by the processor determining, from the image data outputted by the first camera, an azimuthal angle of the object with respect to an optical axis of the first camera and a distance of the object from the first camera.

24. The computer readable medium of claim 23, wherein the instructions cause the processor to determine the location of the user touch by analyzing image data, output by the first camera, of a plurality of kaleidoscope reflections received by the first camera.

25. The method of claim 24, wherein the instructions cause the processor to determine the distance of the object from the first camera by analyzing a spatial separation between two or more of the plurality of kaleidoscope reflections.

26. The method of claim 23, wherein the instructions cause the processor to determine the azimuth angle by analyzing image data, output by the first camera, of at least one kaleidoscope reflection received by the first camera.

* * * * *